US012360731B2

(12) United States Patent
Shin

(10) Patent No.: US 12,360,731 B2
(45) Date of Patent: Jul. 15, 2025

(54) PAIRING AUDIO DATA CHANNELS BASED ON INITIATING, USING A FIRST CLIENT DEVICE, PLAYBACK OF MEDIA ON A SECOND CLIENT DEVICE

(71) Applicant: GOOGLE LLC, Mountain View, CA (US)

(72) Inventor: Dongeek Shin, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 284 days.

(21) Appl. No.: 18/083,281

(22) Filed: Dec. 16, 2022

(65) Prior Publication Data

US 2024/0201938 A1    Jun. 20, 2024

Related U.S. Application Data

(60) Provisional application No. 63/432,941, filed on Dec. 15, 2022.

(51) Int. Cl.
*G06F 3/16* (2006.01)
*G10L 15/22* (2006.01)

(52) U.S. Cl.
CPC .............. *G06F 3/165* (2013.01); *G06F 3/167* (2013.01); *G10L 15/22* (2013.01); *G10L 2015/223* (2013.01)

(58) Field of Classification Search
CPC ......... G06F 3/165; G06F 3/167; G10L 15/22; G10L 2015/223
See application file for complete search history.

(56) References Cited

U.S. PATENT DOCUMENTS

2018/0279962 A1* 10/2018 Sane .................... A61B 5/0531
2019/0088261 A1*  3/2019 Lang ....................... G10L 15/22
(Continued)

FOREIGN PATENT DOCUMENTS

EP        3523797 A1    8/2019
WO    2020078300 A1    4/2020

OTHER PUBLICATIONS

Tofel, K.C.; "Hidden talent: Using Android Wear to control a Chromecast"; retrieved from the Internet: https://gigaom.com/2014/12/11/hidden-talent-using-android-wear-to-control-a-chromecast/; 3 pages; dated Dec. 11, 2014.

(Continued)

*Primary Examiner* — Fan S Tsang
*Assistant Examiner* — David Siegel
(74) *Attorney, Agent, or Firm* — Gray Ice Higdon

(57) ABSTRACT

Techniques disclosed herein are directed towards pairing a first audio data stream of a first client device with a second audio data stream of a second client device based on identifying a user has imitated playback of media at the second client device, where the imitation of the playback by the user occurs at the first client device. Many implementations include the user controlling the media playback at the second client device using one or more automated assistant queries. Various implementations include deleting the pairing between the first audio data stream and the second audio data stream in response to determining whether one or more conditions have been satisfied (e.g., whether the user stops the playback, whether the first client device is a threshold distance away from the second client device, whether a period of time has elapsed, whether the entire media has played at the second client device, whether one or more additional or alternative conditions are satisfied, and/or combinations thereof).

20 Claims, 9 Drawing Sheets

(56) References Cited

U.S. PATENT DOCUMENTS

2019/0173687 A1* 6/2019 MacKay ................. G06F 3/165
2019/0341045 A1* 11/2019 Reilly .................... G10L 15/02

OTHER PUBLICATIONS

Vithala, R.; "Control Media Playing In Chromecast With Your Smartwatch Using Music Boss for Wear App"; The Wearable News, retrieved from the internet: https://thewearablenews.com/control-media-playing-chromecast-smartwatch-using-music-boss-wear-app/; 6 pages; dated Jul. 22, 2014.

Hindustan Times Correspondent; "YouTube adds voice search support to screen casting: How to use the new feature"; retrieved from the internet: https://tech.hindustantimes.com/tech/news/youtube-adds-voice-search-support-to-screen-casting-how-to-use-the-new-feature-story-rSnm3wHY2F7HNug199DFnl.html; 6 pages; dated Dec. 26, 2019.

European Patent Office; International Search Report and Written Opinion issued in Application No. PCT/US2022/053215; 11 pages; dated Sep. 8, 2023.

* cited by examiner

PAIRING AUDIO DATA CHANNELS BASED ON INITIATING, USING A FIRST CLIENT DEVICE, PLAYBACK OF MEDIA ON A SECOND CLIENT DEVICE

BACKGROUND

An automated assistant (also known as a "personal assistant", "mobile assistant", etc.) may be interacted with by a user via a variety of client devices such as smart phones, tablet computers, wearable devices, automobile systems, standalone personal assistant devices, and so forth. An automated assistant receives input from the user including spoken natural language input (i.e., utterances) and may respond by performing an action, by controlling another device and/or providing responsive content (e.g., visual and/or audible natural language output). An automated assistant interacted with via a client device may be implemented via the client device itself and/or via one or more remote computing devices that are in network communication with the client device (e.g., computing device(s) in the cloud).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken general invocation phrases, which are also known as "hot words/ phrases", "trigger words/phrases", or "keywords/phrases". For example, a spoken invocation phrase such as "Hey Assistant," "OK Assistant", and/or "Assistant" can be spoken to invoke an automated assistant.

However, one or more factors may negatively impact speech recognition of an utterance spoken by the user captured via one or more microphones of a given client device, such as the distance between the user and the given client device, any background noise additionally captured by the microphone(s) of the given client device, etc. For instance, audio data rendered via one or more speakers of the given client device can interfere with capturing the utterance via the one or more microphones of the given client device.

SUMMARY

Techniques disclosed herein are directed towards generating a pairing between a first audio data stream of a first client device and a second audio data stream of a second client device, where the pairing is generated in response to receiving input at the first client device to initiate playback of media at the second client device. In some implementations, the pairing can be between a first audio data stream, captured via one or more first microphones of the first client device, and a second audio data stream, captured via one or more second microphones of the second client device. The system can process an automated assistant query captured in the first audio data stream and/or the second audio data stream based on the system determining the user has invoked an automated assistant client and based on the pairing. In some implementations, the system can control the media playback at the second client device based on the query.

For example, a user can use their mobile phone (e.g., the first client device) to initiate playback of a video on their television (e.g., the second client device). In response to determining the user initiated playback of the video on the television from their mobile phone, the system can generate a pairing between a mobile phone audio data stream (e.g., an audio data stream captured via one or more microphones of the mobile phone) and a television audio data stream (e.g., an audio data stream captured via one or more microphones of the television). After initiating playback of the media at the second client device, the user can control the media playback using one or more automated assistant queries. For instance, the user can invoke the automated assistant by speaking an invocation phrase of "Assistant". In response to determining the user invoked the automated assistant client, and based on the pairing, the system can process the mobile phone audio data stream and/or the television audio data stream. In other words, based on the pairing, the system can open the mobile phone microphone(s) and the television microphone(s) in response to determining the user has invoked the automated assistant.

In some implementations, the pairing can include an association between the first audio data stream and the second audio data stream, where the first audio data stream and the second audio data stream are processed individually. In furtherance of the previous example, the mobile phone audio data stream (e.g., the audio data stream captured via the one or more microphones of the mobile phone) can be processed at the mobile phone, at a computing system remote from the mobile phone (e.g., a server), at one or more computing devices, and/or combinations thereof. Similarly, the television audio data stream (e.g., the audio data stream captured via the one or more microphones of the television) can be processed at the television, at a computing system remote from the television (e.g., a server), at one or more computing devices, and/or combinations thereof.

In some implementations, the pairing can generate a merged audio data stream which includes portion(s) of the first audio data stream and portion(s) of the second audio data stream. For example, the merged audio data stream can include audio data captured at both the one or more first microphones and the one or more second microphones, audio data captured at the one or more first microphones but not captured at the one or more second microphones, and audio data captured at the one or more second microphones but not captured at the one or more first microphones. In some implementations, one or more of the first and/or second microphones can capture audio output rendered by the second client device, where the audio output is based on an audio portion of the media. In some of those implementations, the system can subtract the audio output from the merged audio data stream. In other words, the audio generated by playing the media at the second client device can be removed from the merged audio data stream to prevent the audio data from masking one or more portions of a query in the merged audio data stream.

In some implementations, subsequent to invoking the automated assistant, the user can speak a query to control playback of the media at the second client device. For example, the user can speak the query of "pause", "pause the movie", "fast forward", "stop", "play", "rewind", "skip ahead 20 seconds", "restart the show", one or more additional or alternative queries, and/or combinations thereof. In some implementations, the one or more first microphones of the first client device may capture a better representation of the spoken query than the one or more second microphones of the second client device. For instance, the user may be closer to the first client device than the second client device, the user may be facing the first client device and facing away from the second client device, etc. Additionally or alternatively, one or more background noises may mask one or more portions of the spoken query in the second audio data stream. For example, a dog may be barking next to the second client device. In some implementations, one or more speakers of the second client device can render output based on the media. In some of those implementations, the output can mask one or more portions of the spoken query in the second audio data stream. For instance, the user may be playing an action movie using the second client device, and sound(s) (e.g., music, sound effects, spoken dialog, etc.) from the action movie can mask at least a portion of the spoken query.

Conversely, the one or more second microphones of the second client device may capture a better representation of the spoken query than the one or more first microphones of the first client device. For instance, the user may be closer to the second client device than the first client device, the user may be facing the second client device and facing away from the first client device, etc. Additionally or alternatively, one or more background noises may mask portions of the spoken query in the first audio data stream. For instance, a second user may be speaking an additional utterance next to the first client device, where the additional utterance can mask portion(s) of the spoken query.

In some implementations, the spoken query may be captured in both the first audio data stream and the second audio data stream with similar audio fidelity. However, one of the client devices may have better hardware and/or software, which can lead to one of the client devices generating a more accurate speech recognition of the spoken query than the other device. For instance, one or more first microphones of the first client device may be objectively better quality than the one or more second microphones of the second client device, thus the one or more first microphones can capture a higher quality audio representation of the spoken query. Additionally or alternatively, an objectively better quality speech recognition model may be associated with one of the client devices. For instance, the speech recognition model associated with the first client device can be an objectively better speech recognition model than the speech recognition model associated with the second client device, where the objectively better speech recognition model associated with the first client device can be used to generate a more accurate speech recognition of the query By pairing the first audio data stream and the second audio data stream, the system can automatically use the (objectively) better audio data stream to determine whether the user spoke a query to control the media playing on the second client device. In other words, while the user is casting media from the first client device to the second client device and based on the pairing, the system can automatically open microphone(s) of the first client device and microphone(s) of the second client device to capture a query which can be used to control the media playback of the second client device.

In some implementations, the system can continue pairing the first audio data stream and the second audio data stream until one or more conditions are satisfied, such as the system can continue pairing the audio data streams until the media has completed playing at the second client device, until the user stops playback of the media via the first client device or the second client device, until the first client device moves more than a threshold distance away from the second client device, until a threshold value of time has elapsed, while the first client device and the second client device are connected via the same wireless network (e.g., a Wi-Fi network), until one or more conditions are satisfied, and/or combinations thereof. In some implementations, the system can delete the pairing when the one or more conditions are satisfied.

Accordingly, various implementations set forth techniques for pairing a first audio data stream and a second audio data stream based on a user initiating the playback of media at a second client device, where the user initiates the playback at a first client device. By pairing the first and second audio data streams, the system can capture automated assistant queries spoken by the user using the microphone(s) of the client device closest to the user. For example, Gavin can stream an episode of a television show from his mobile phone (the first client device) to a television (the second client device). By pairing the mobile phone audio data stream and the television audio data stream, the system can capture automated assistant queries spoken by Gavin to control the media playback at the television at the mobile phone (which is frequently closer to Gavin while streaming the television show than the television). Furthermore, by pairing the audio data streams, the system can capture automated assistant queries to control media playback even as Gavin moves around the room (and potentially changing the distance between him and the mobile phone and/or the television). Computing resources (e.g., processor cycles, memory, battery power, etc.) can be conserved by capturing audio data which includes control commands. Otherwise, if the system cannot determine the command (e.g., due to the distance between Gavin and the television (the second client device)), additional computing resources must be used when Gavin repeats the spoken command.

The above description is provided only as an overview of some implementations disclosed herein. These and other implementations of the technology are disclosed in additional detail below. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In some implementations, various client devices (e.g., a smart display, a smart television, etc.) can allow direct casting of media content from a different client device (e.g., a mobile phone). Voice commands provide a user a natural way to control the playback of the casted media content. To quickly and/or naturally control casted media content, the user could talk to the endpoint of an automatic assistant client which is defined by the device rendering output based on the media. In some implementations, it may be difficult for a user to directly communicate with client device rendering the media output due to (1) the distance between the client device rendering the content and the user (e.g., such as across a room) which can degrade speech fidelity which can result in low-accuracy automatic speech recognition results on the automated assistant client backend and (2) audio content rendered by the client device can mask portion(s) of spoken control commands.

In some implementations, the casting device (e.g., the mobile phone) can be used as a query endpoint due to how the mobile phone is digitally tied to the television while casting media. Additionally or alternatively, one or more microphones of both of the client devices (e.g., the mobile phone and the television) can be listening for an invocation phrase (e.g., 'Assistant', 'OK Assistant', 'Hey Assistant', etc.). In some implementations, an audio data stream corresponding to each device can be paired (e.g., an audio data stream of the mobile phone and an audio data stream of the television can be paired) such that they end up with the same automated assistant backend given the casting information (e.g., CAST: USER_DEVICE_MOBILE_PHONE→USER_ DEVICE_TELEVISION).

From the user's point of view, the system can result in a higher-fidelity assistant querying experience with the help of the casting device (which is usually closer to the user than the television) acting as an additional query endpoint. In some implementations, the user does not have to actively engage with the casting device either since the system can process any natural speech captured while casting the media content to determine whether it includes a media playback control command. Additionally or alternatively, when the client device disengages in casting, the system can delete the pairing, such as by collapsing the paired query endpoints can collapse down to the assistant endpoint of the client device which was used to render output based on the cast media.

Figure 1:
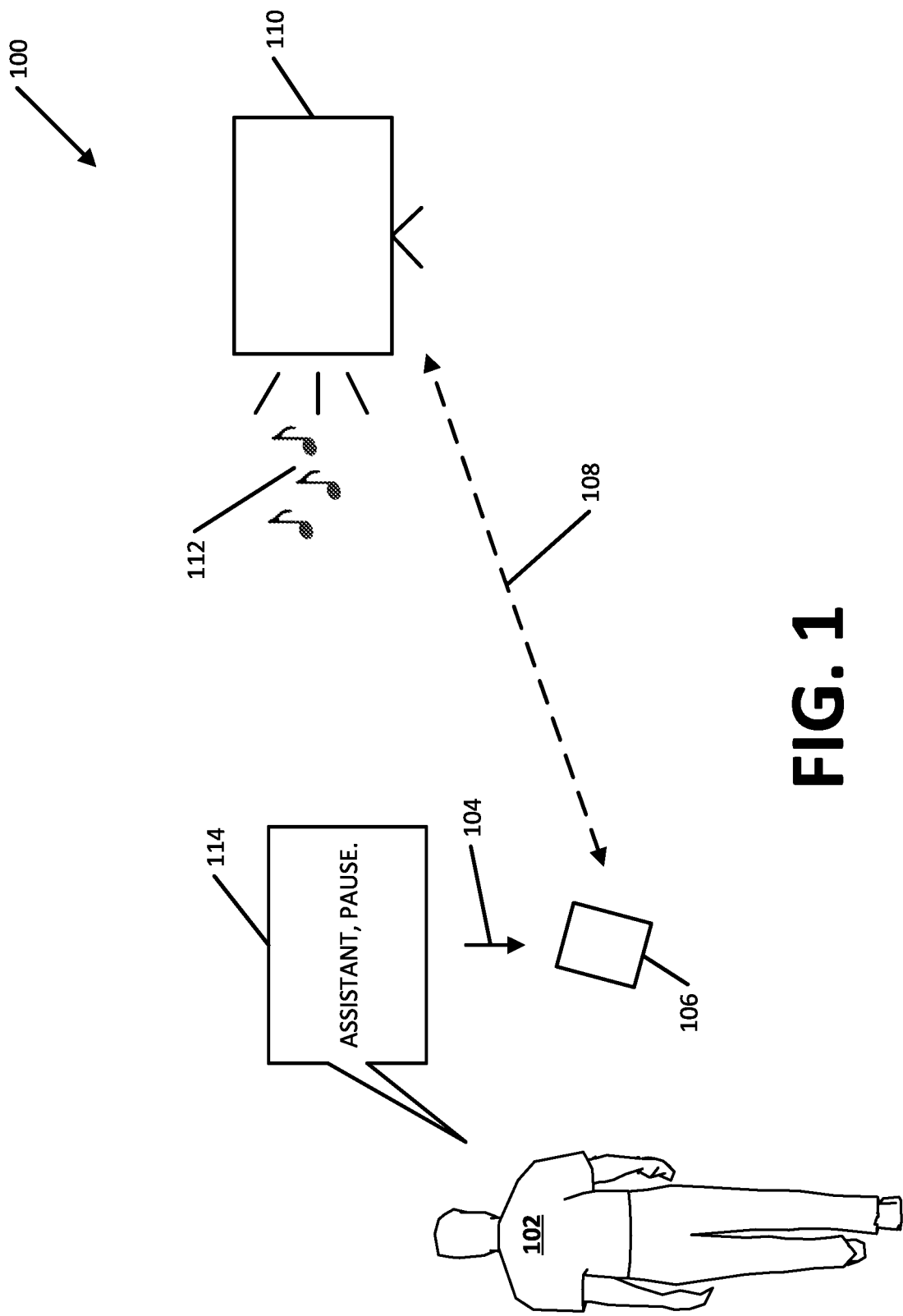
FIG. 1 illustrates an example of pairing a first audio data stream with a second audio data stream in accordance with various implementations disclosed herein.

Turning now to the figures, FIG. 1 illustrates an example 100 of a pairing of a first audio channel of a first client device and a second audio channel of a second audio device. Example 100 includes a user 102 who has used a first client device 106 to initiate playback of media at a second client device 110. In the illustrated example 100, the first client device 106 is a mobile phone and the second client device 110 is a television. However, this is not meant to be limiting. The first client device 106 and/or the second client device 110 can include a variety of additional or alternative client devices. Some non-limiting examples include a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing devices may be provided.

In some implementations, user 102 can use the mobile phone (e.g., the first client device 106) to initiate the playback of media via the television (e.g., the second client device 110). For instance, the user 102 can cast media content from their mobile phone to the television. The first audio data stream can be captured via one or more first microphones of the first client device 106. Similarly, the second audio data stream can be captured via one or more second microphones of the second client device 110. In some implementations, the pairing can be generated at the first client device, the second client device, and/or at an additional computing system remote from the first client device and the second client device (e.g., at a remote server).

In some implementations, the system can generate a pairing 108 between a first audio data stream of the first client device 106 (e.g., the mobile phone) and a second audio data stream of the second client device 110 (e.g., the television). In some implementations, the pairing can be an association between the first audio data stream and the second audio data stream, where the association provides an indication to the automated assistant client to open both the one or more first microphones of the first client device 106 and the one or more second microphones of the second client device 110 in response to the user invoking an automated assistant client of the first client device and/or an automated assistant client of the second client device.

In some implementations, the pairing can indicate a merged audio data stream, where portion(s) of the first audio data stream (e.g., captured via the one or more first microphones of the first client device) and portion(s) of the second audio data stream (e.g., captured via the one or more second microphones of the second client device) are merged into a shared audio data stream (e.g., the merged audio data stream). In some other implementations, the pairing can indicate a merged audio data stream, where portion(s) of the first audio data stream (e.g., captured via the one or more first microphones of the first client device) and portion(s) of the second audio data stream (e.g., captured via the one or more second microphones of the second client device) are merged by processing the first audio data stream and the second audio data stream in parallel. Additionally or alternatively, the system can process the merged audio data stream in response to the user invoking an automated assistant client of the first client device and/or an automated assistant client of the second client device.

The media playing on the second client device 110 can include a variety of types of media such as one or more videos, one or more songs, one or more podcasts, one or more audio calls (such as a phone call), one or more video calls, one or more additional or alternative types of media, and/or combinations thereof. For example, the media can include an audio portion and a video portion. In some implementations, output 112 based on the audio portion of the media can be rendered for the user via one or more speakers of the second client device 110.

In response to detecting an invocation of the automated assistant client by the user and based on the pairing (e.g., the pairing of the first client device 106 and the second client device 110), the system can process the query captured in either the first audio data stream and/or the second audio data stream. In other words, in response to the invocation and based on the pairing, the system can open the one or more first microphones of the first client device and the one or more second microphones of the second client device.

In the illustrated example 100, the user 102 is next to their mobile phone 106 and is across the room from the television 110. Additionally or alternatively, the user speaks the utterance 114 of "ASSISTANT, PAUSE" to pause playback of the media on the television, where the "ASSISTANT" portion of the utterance invokes the automated assistant, and the "PAUSE" portion of the utterance provides a command to control media playback. The utterance 114 of "ASSISTANT, PAUSE" is captured via one or more first microphones of the first client device 104.

In some implementations, the distance between the user 102 and the television 110 (e.g., across the room) can degrade the fidelity of speech recognition of the utterance "ASSISTANT, PAUSE" 114 captured via one or more microphones of the television 110. Additionally or alternatively, the output 112 can mask one or more portions of the utterance at the one or more microphones of the television 110.

Figure 2:
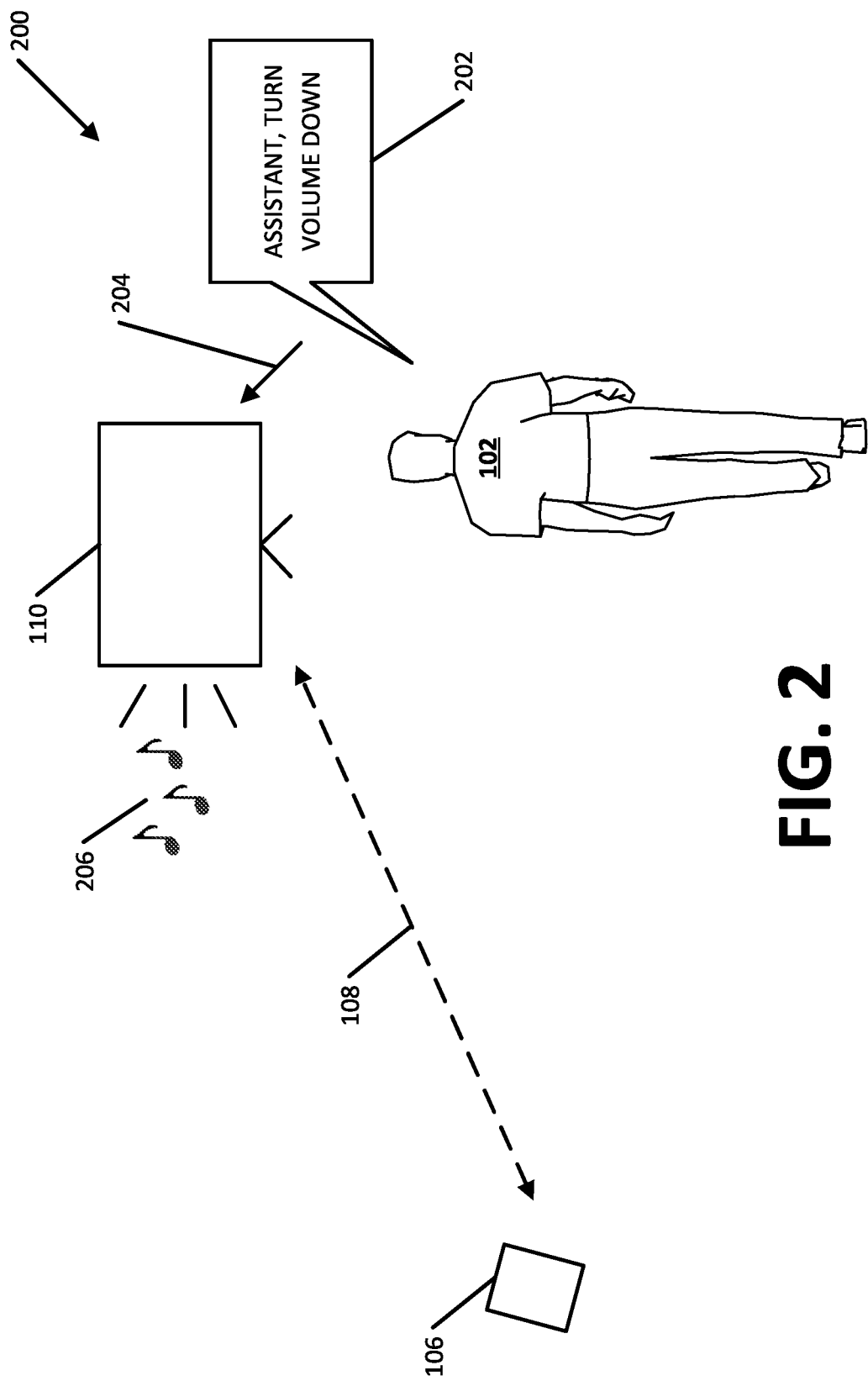
FIG. 2 illustrates another example of pairing a first audio data stream with a second audio data stream in accordance with various implementations disclosed herein.

FIG. 2 illustrates another example 200 of the pairing of the first audio channel of the first client device and the second audio channel of the second client device. Example 200 includes the user 102 who has used the first client device 106 to initiate playback of media at the second client device 110. In some implementations, the system generates the pairing 108 between the first audio data stream and the second audio data stream. Additionally or alternatively, the media playing on the second client device 110 can include an audio portion and/or a video portion. In some implementations, output 206 can be based on the audio portion of the media that can be rendered for the user via one or more speakers of the second client device 110.

In contrast to example 100, where the user is next to the mobile phone and across the room from the television, the user 102 in example 200 is standing next to the television 110 (e.g., the second client device) and across the room from the mobile phone 106 (e.g., the first client device). The user 102 speaks the utterance 202 of "ASSISTANT, TURN VOLUME DOWN" to control the volume of the media playback on the television. In some implementations, the "ASSISTANT" portion of the utterance 202 invokes the automated assistant, and the "TURN VOLUME DOWN" portion of the utterance 202 provides a command to control media playback.

In the illustrated example 200, the utterance 202 can be captured 204 via the one or more second microphones of the second client device 110. In some implementations, the utterance 202 may not be captured and/or clearly captured via the one or more first microphones of the first client device 106. For example, the distance between the user 102 and the first client device 106 may reduce the quality of the audio data capturing the spoken utterance 202 significantly. Additionally or alternatively, the audio data output 206 may interfere with capturing the spoken utterance via the one or more first microphones of the first client device 106. For example, the audio output 206 can include loud explosions, screaming, loud music, one or more additional or alternative sounds, and/or combinations thereof. In the illustrated example 200, the user 102 is further away from the first client device 106 than the second client device 110. If the audio data output 206 includes an explosion at the same time the user says the word "DOWN" in the spoken utterance 202, the one or more first microphones of the first client device 106 may not capture the word "DOWN".

As described above with respect to FIG. 1, the system can generate a pairing 108 between a first audio data stream of the first client device 106 and a second audio data stream of the second client device 110. For example, the pairing 108 can merge the first audio data stream and the second audio data stream. In some of those implementations where one or more portions of the spoken utterance 202 are not clearly captured at the one or more first microphones of the first client device 106, the system can use portion(s) of the second audio data stream capturing the spoken utterance 202. In other words, despite distance from the microphone(s), interference from audio data output, one or more interference in capturing the spoken utterance, and/or combinations thereof, the system can still capture and/or process the user command to control the second client device via the merged audio data stream.

Figure 3:
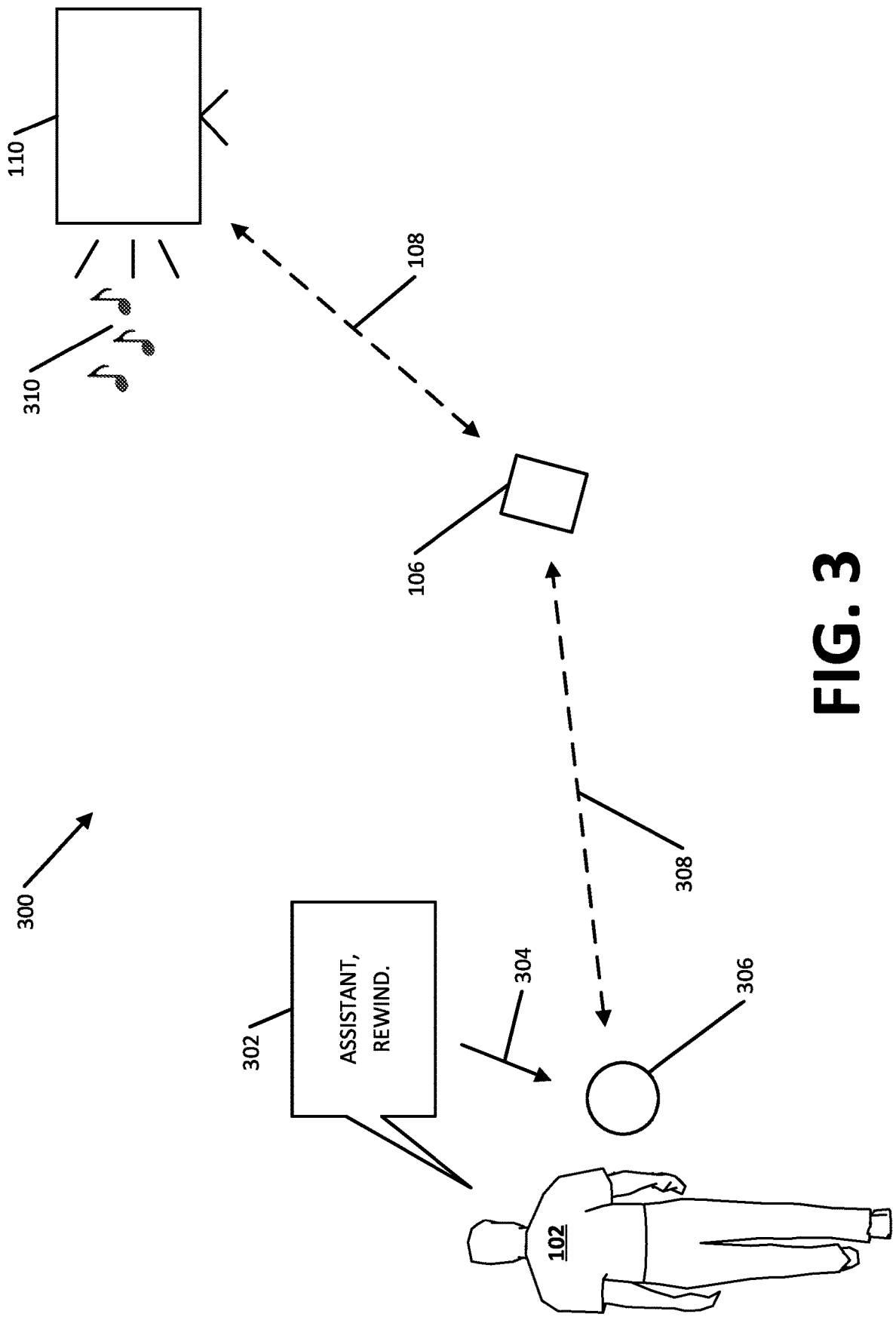
FIG. 3 illustrates an additional example of pairing a first audio data stream with a second audio data stream in accordance with various implementations disclosed herein.

FIG. 3 illustrates another example 300 of pairing the first audio channel of the first client device and the second audio channel of the second client device. Example 300 includes the user 102 who has used the first client device 106 to initiate playback of media at the second client device 110. In some implementations, the media playing at the second client device can include output 310 based on an audio data portion of the media. In some implementations, the system generates the pairing 108 between the first audio data stream and the second audio data stream as described herein with respect to FIG. 1.

Example 300 additionally includes a third client device 306. In some implementations, there is an additional pairing 308 between the first client device 106 and the third client device 306. For example, the user 102 can have a smart watch (the third client device 306) which is paired with a mobile phone (the first client device 106). In some of those implementations, the pairing between the third client device 306 and the first client device 106 may implemented via one or more local area networks and/or one or more wide area networks (e.g., a Wi-Fi network, the Internet, a personal area network such as Bluetooth network, a radio frequency identification (RFID) network, one or more additional or alternative networks, and/or combinations thereof). For example, the pairing between the smart watch 306 and the mobile phone 106 can be via Bluetooth. The user can use a mobile phone 106 to initiate playback of a movie (the media) at a television 110. In some implementations, the system can generate the pairing 108 between a mobile phone audio data stream and the television audio data stream 110 via a Wi-Fi network. In the example 300, the pairing 108 between the first client device 106 and the second client device 110 is via a different network than the pairing 308 between the first client device 106 and the third client device 306. However, this is merely illustrative. In some other implementations, the pairing 108 and the pairing 308 can be via the same network.

Additionally or alternatively, the user 102 can speak an utterance 302 of "ASSISTANT, REWIND". In some implementations, one or more microphones of the third client device 306 can capture 304 the spoken utterance 302. In some of those implementations, the user can be a distance from the first client device 106 and/or the second client device 110 where the spoken utterance cannot be captured via the one or more first microphones and/or the one or more second microphones. For example, the user 102 who is wearing the smart watch 306 can move from the living room to the kitchen to get a snack while the movie is rendered via the television 110, where the television 110 rendering the movie is in the living room.

In some of those implementations, the user 102 can leave their mobile phone 106 in the living room when they move to the kitchen for snacks (e.g., so they have both hands available to carry more snacks). In some such implementations, the user can control the media playback on the television 110 when they are not in range of the one or more first microphones of the mobile phone and/or the one or more second microphones of the television by capturing the spoken utterance 302 of "ASSISTANT, REWIND" using one or more third microphones of the smartwatch 306.

Figure 4:
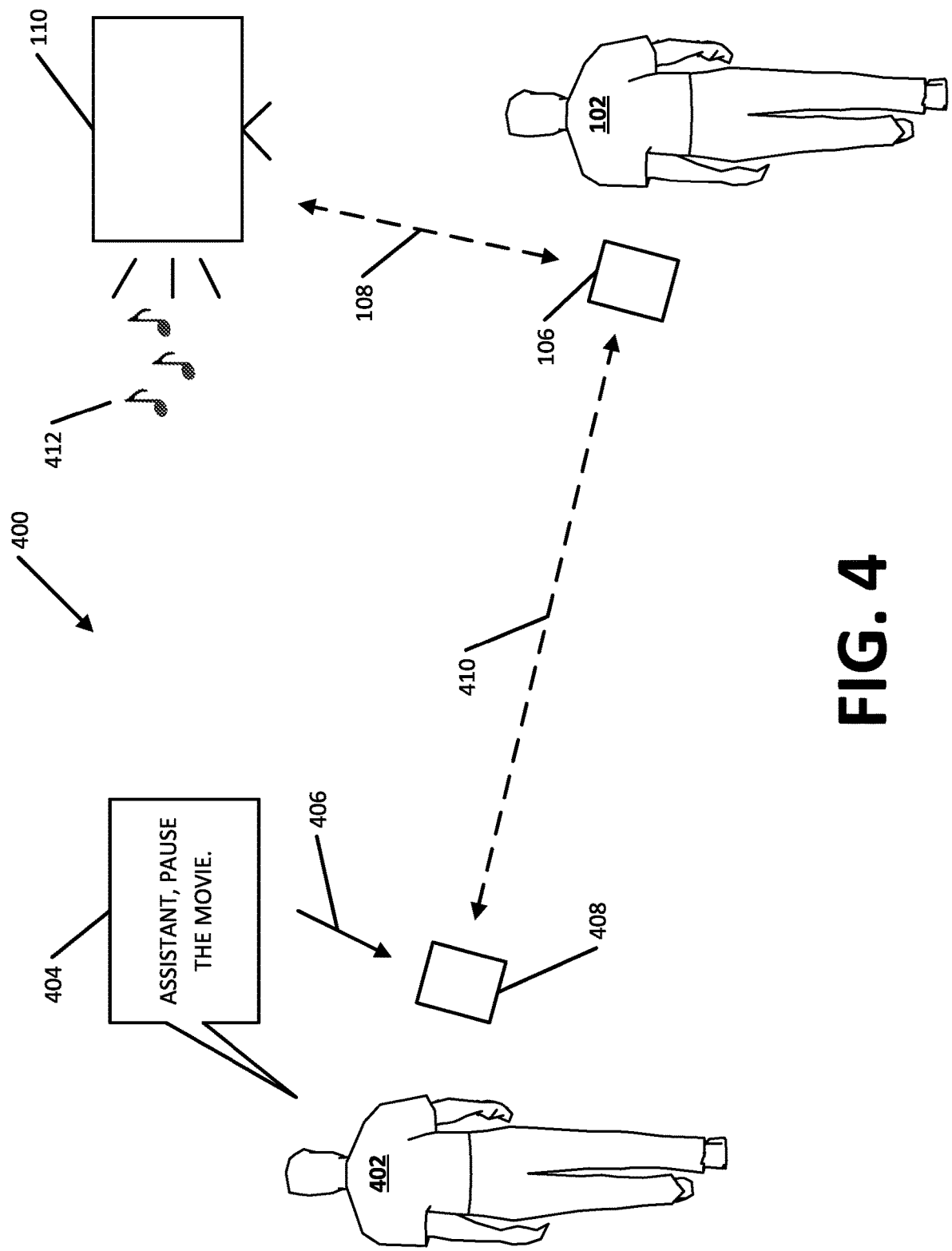
FIG. 4 illustrates a further example of pairing a first audio data stream with a second audio data stream in accordance with various implementations disclosed herein.

FIG. 4 illustrates another example of controlling media playback using paired audio data channels. Example 400 includes the user 102, the first client device 106, the second client device 110, and the pairing 108 between the first client device and the second client device described herein. Additionally or alternatively, example 400 includes an additional user 402 with an additional client device 408. For example, the user 102 can have a mobile phone 106 and the additional user 402 can have their own corresponding additional mobile phone 408. In some implementations, the additional user 402 is not a registered user of the first client device 106 and/or the second client device 110, but is a registered user of the additional client device 408.

In some implementations, the system can identify the speaker of an utterance (e.g., by comparing one or more features of the speaker's voice with one or more voiceprints associated with known users of the client device). In some of those implementations, the system can control the media playback at the second client device 110 based on commands spoken only by registered users. In other words, if the additional user 402 is not a known user of the first client device 106 and/or the second client device 110, the system will not control media playback at the second client device 110 based on the additional user speaking the utterance 404 of "ASSISTANT, PAUSE THE MOVIE."

However, in some implementations it may be desirable for the additional user 402 to control the media playback at the second client device 110. For example, the additional user 402 may be a friend of the user 102 and they are watching a movie together. In some implementations, the system can create an additional pairing 410 between the first client device 106 and the additional client device 408. For example, the additional pairing 410 can be created based on the additional client device 408 and the client device 106 being on the same wireless network (e.g., both the mobile phone 106 of the user 102 and the mobile phone 408 of the additional user 402 are part of the same wireless network), based on a permission granted by the user 102 (e.g., if the system detect the additional user 402 speaking command utterances, the system can send a notification to the mobile device 106 of the user 102 to grant or deny permission for the additional user 402 to control media playback at the television 110), based on one or more additional or alternative conditions, and/or combinations thereof.

For example, the system can determine the first client device 106 (of the user 102) and the additional client device 408 (of the additional user 402) are connected 410 via the same Wi-Fi network. In some implementations, when the additional user 402 speaks the utterance 404 of "ASSISTANT, PAUSE THE MOVIE", audio data capturing the utterance 404 can be captured via one or more microphones of the additional client device 408.

Figure 5:
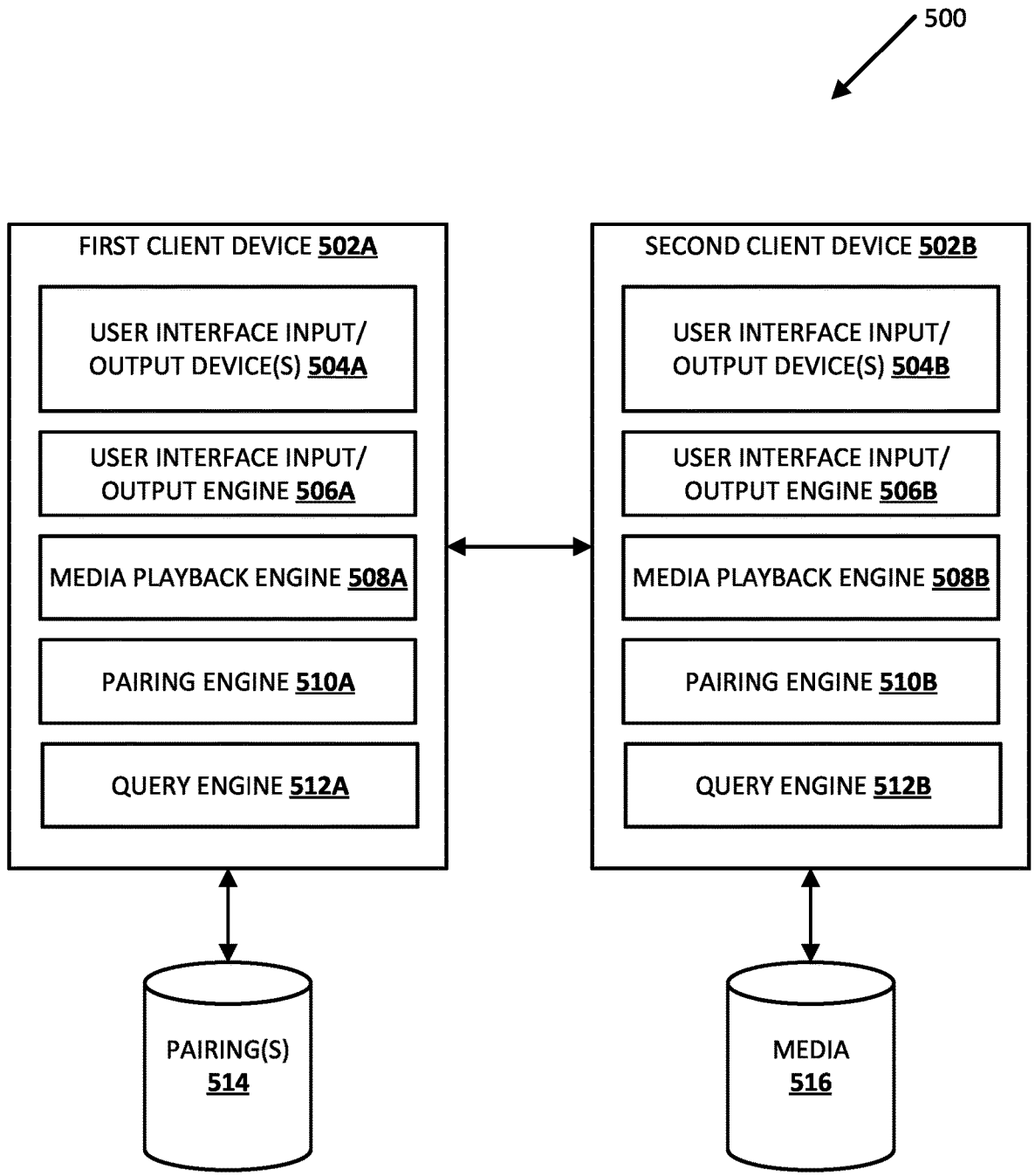
FIG. 5 illustrates a block diagram of an example environment in which various implementations disclosed herein may be implemented.

FIG. 5 illustrates a block diagram of an example environment 500 in which implementations disclosed herein may be implemented. The example environment 500 includes a first client device 502A which can include one or more user interface input/output devices 504A, user interface input/output engine 506A, media playback engine 508A, paring engine 510A, query engine 512A, one or more additional or alternative engines (not depicted), and/or combinations thereof. The example environment 500 additionally includes second client device 502B which can include one or more user interface input/output devices 504B, user interface input/output engine 506B, media playback engine 508B, pairing engine 510B, query engine 512B, one or more additional or alternative engines (not depicted), and/or combinations thereof. Additionally or alternatively, the first client device 502A and/or the second client device 502B can be associated with parings 514, media 516, one or more additional or alternative components (not depicted), and/or combinations thereof.

In some implementations, the first client device 502A and/or the second client device 502B may include may include user interface input/output devices 504, which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing systems of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of the first client device 502A and/or the second client device 502B may be implemented on a computing system that also contains the user interface input/output devices.

Some non-limiting examples of the first client device 502A and/or the second client device 502B include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. The first client device 502A and/or the second client device 502B may include one or more memories for storage of data and software applications, one or more processors for accessing data and executing applications, and other components that facilitate communication over a network. The operations performed by the first client device 502A and/or the second client device 502B may be distributed across multiple computing devices. For example, computing programs running on one or more computers in one or more locations can be coupled to each other through a network.

In some implementations, user interface input/output engine 506 can be used to capture a spoken utterance via one or more microphones. For example, the user interface input/output engine 506A can be used to capture an utterance via one or more microphones 504A of the first client device 502A. Similarly, the user interface input/output engine 506B can be used to capture a spoken utterance via one or more microphones 504B of the second client device 502B.

In some implementations, the system can control media playback using media playback engine 508. For example, the media playback engine 508A at the first client device 502A can identify the media selected by the user for playback on the second client device 502B. Similarly, media playback engine 508B can control the playback of the media at the second client device 502B. For example, the media playback engine 508B can pause the media playback, fast forward the media playback, etc.

Pairing engine 510 can create a pairing between the first client device 502A and the second client device 502B. In some implementations, the pairing can be created based on the user initiating playback of the media at the second client device 502B, where the user initiates the playback using the first client device 502A. Additionally or alternatively, pairing engine 510 can store one or more pairings 514. In some of those implementations, the system can store information related to a pairing between the first client device 502A and the second client device 502B. In some implementations, pairing engine 510 can be used to delete the pairing between the first client device 502A and the second client device 502B based on determining the casting of the media to the second client device 502B has ended.

In some implementations, query engine 512 can be used to identify an automated assistant query in the first audio data stream of the first client device 502A and/or the second audio data stream of the second client device 502B. Additionally or alternatively, query engine 512 can identify one or more commands to control playback of the media at the second client device 502B based on a spoken query.

Figure 6:
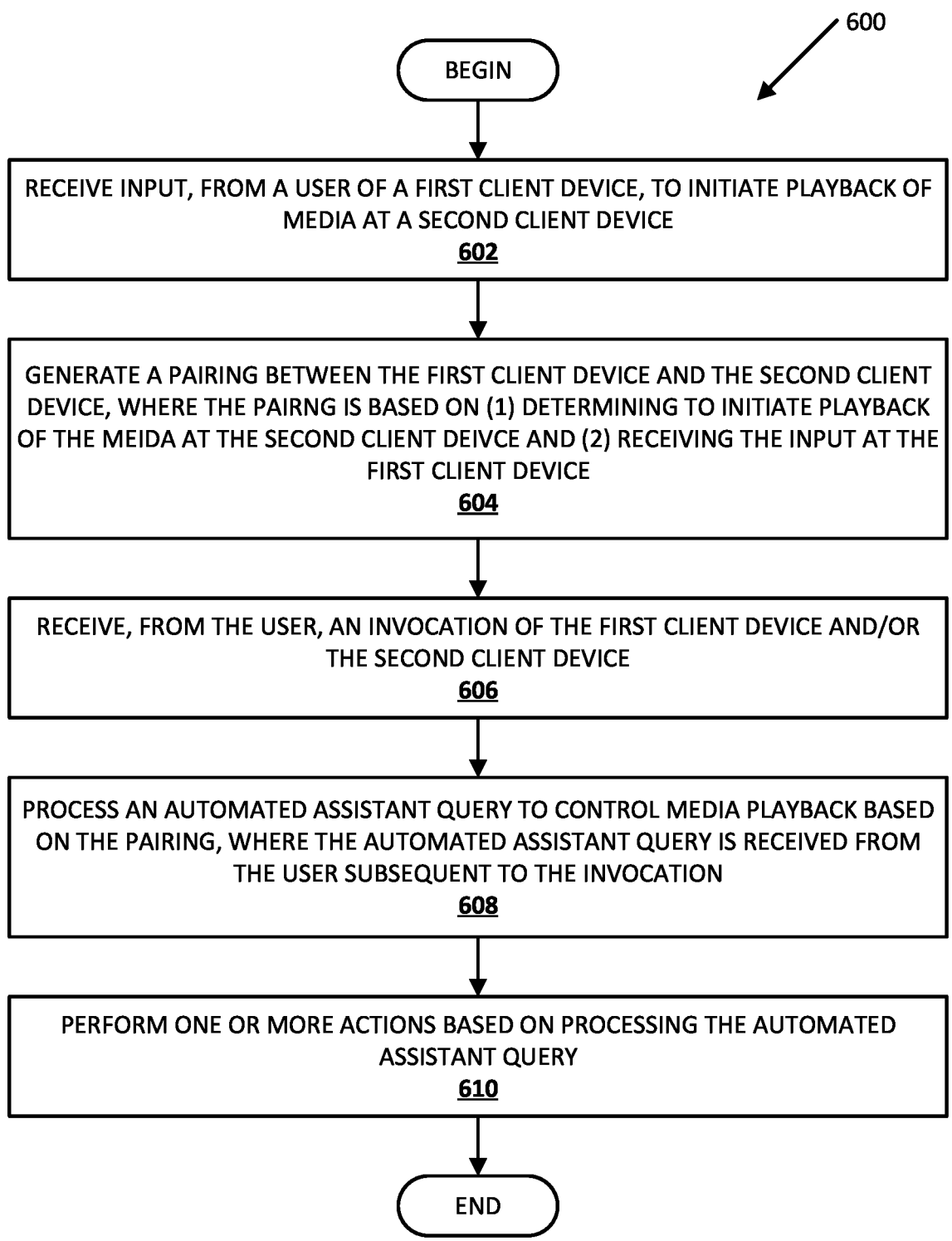
FIG. 6 is a flowchart illustrating an example process of controlling media playback based on a pairing of a first audio data stream and a second audio data stream in accordance with various implementations disclosed herein.

FIG. 6 is a flowchart illustrating an example process of 600 of controlling media playback based on a pairing of a first audio data stream and a second audio data stream in accordance with various implementations disclosed herein. For convenience, the operations of the flowchart are described with reference to a system that performs the operations. This system may include various components of various computer systems, such as one or more components of first client device 502A, second client device 502B, client device 802 and/or computing system 910. Moreover, while operations of process 600 are shown in a particular order, this is not meant to be limiting. One or more operations may be reordered, omitted, and/or added.

At block 602, the system receives input, from a user of a first client device, to initiate playback of media at a second client device. In some implementations, the user can invoke an automated assistant client on their mobile phone by speaking an utterance to initiate playback of media on their television, such as "Hey Assistant, please play the movie 'Hypothetical Dance' on the television", where the "Hey Assistant" portion of the utterance can invoke the automated assistant client at the first client device and the "please play the movie 'Hypothetical Dance' on the television" portion can initiate playback of the movie 'Hypothetical Dance' on the television. In some other implementations, the system can initiate playback of media at the second client device by selecting a button (e.g., a hardware button, a virtual button, etc.) at the first client device, where the button indicates the user would like to initiate playback of the media at the second client device. For instance, the user, while viewing an episode of 'Hypothetical Comedy Series' on a standalone assistant client with a display (e.g., the first client device), can select a button to cast the video to a smart television (e.g., a second client device), where selecting the button initiates playback of the episode of the 'Hypothetical Comedy Series' on the smart television. A user may initiate the playback of media at the second client device using the first client device in additional or alternative ways.

At block 604, the system generates a pairing between the first client device and the second client device. In some implementations, the pairing is based on (1) determining to initiate playback of the media at the second client device and (2) receiving the input at the first client device. In some implementations, the system can generate a pairing between a first audio channel of the first client device and a second audio channel of the second client device. In some of those implementations, the first audio channel can be captured via one or more first microphones of the first client device. Similarly, the second audio channel can be captured via one or more second microphones of the second client device.

In some implementations, the pairing can include merging the first audio data stream (captured via the one or more first microphones of the first client device) and the second audio data stream (captured via the one or more second microphones of the second client device) into a merged audio data stream. In some of those implementations, one or more instances of audio data may be aligned in the merged audio data stream. For example, the distance between the user, the first client device, and the second client device may cause a slight delay in the time an utterance spoken by the user is captured in the first audio data stream compared to the second audio data stream.

In some implementations, the pairing between the first audio data stream and the second audio data stream can merge the first and second audio data streams into a merged audio data stream. For instance, the system can generate a merged audio data stream which includes data captured via the one or more first microphones of the first client device (e.g., the first audio channel) and data captured via the one or more second microphones of the second client device (e.g., the second audio channel).

Additionally or alternatively, the pairing between the first audio data stream and the second audio data stream can be an associated between the first audio data stream and the second audio data stream, where the first audio data stream and the second audio data stream are processed in parallel (e.g., processing the first audio data stream and the second audio data stream in parallel without generating the merged audio data stream).

At block 606, the system receives, from the user, an invocation of an automated assistant client of the first client device and/or an automated assistant client of the second client device. In some implementations, the user can invoke the automated assistant by speaking an invocation phrase such as 'ASSISTANT', 'OK ASSISTANT', 'HEY ASSISTANT', etc.

At block 608, the system processes an automated assistant query to control media playback based on the pairing. In some implementations, the automated assistant query is received from the user subsequent to the invocation of the automated assistant client. For example, the user can speak an automated assistant query to control the media playback following the invocation phrase such as "ASSISTANT, PAUSE" to pause media playback, "OK ASSISTANT, FAST FORWARD" to fast forward media playback, "ASSISTANT, START OVER" to replay the media from the beginning, one or more additional or alternative phrases, and/or combinations thereof.

At block 610, the system performs one or more actions based on processing the automated assistant query. For example, system can pause media playback based on the automated assistant query "ASSISTANT, PAUSE", the system can fast forward media playback based on the automated assistant query "OK ASSISTANT, FAST FORWARD", the system can replay the media from the beginning based on the automated assistant query "ASSISTANT, START OVER", etc.

Figure 7:
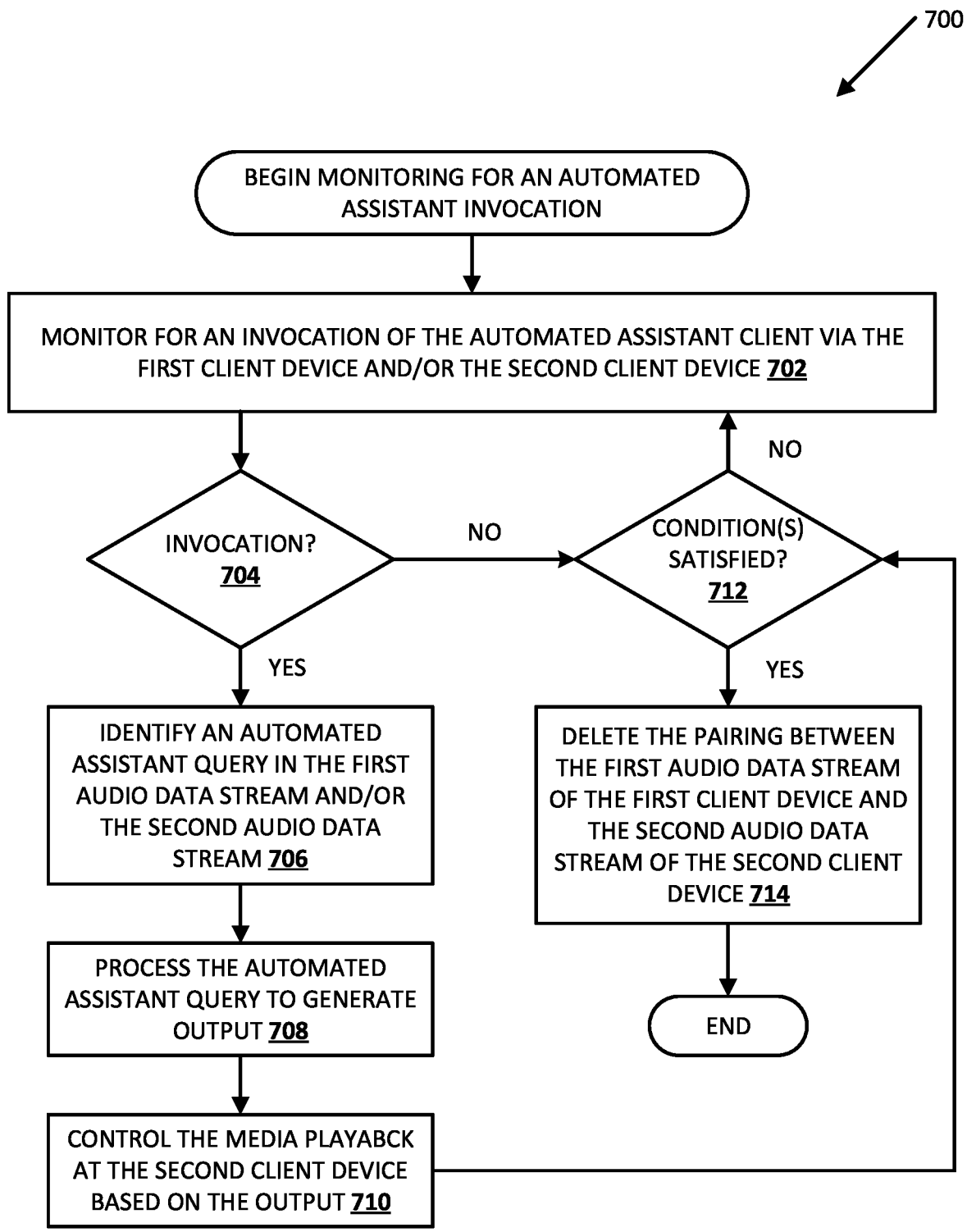
FIG. 7 is a flowchart illustrating an additional example process of controlling media playback based on a pairing of a first audio data stream and a second audio data stream in accordance with various implementations disclosed herein.

FIG. 7 is a flowchart illustrating an example process of 700 of controlling media playback based on a pairing of a first audio data stream and a second audio data stream in accordance with various implementations disclosed herein. For convenience, the operations of the flowchart are described with reference to a system that performs the operations. This system may include various components of various computer systems, such as one or more components of first client device 502A, second client device 502B, client device 802 and/or computing system 910. Moreover, while operations of process 700 are shown in a particular order, this is not meant to be limiting. One or more operations may be reordered, omitted, and/or added.

At block 702, the system monitors for an invocation of the automated assistant client of the first client device and/or the second client device. In some implementations, the system can monitor the merged audio data stream for an invocation phrase. In some other implementations, the system can process the first audio data stream and the second audio data stream (e.g., in parallel) to monitor for an invocation phrase. Additionally or alternatively, the system can monitor for a non-verbal invocation of the automated assistant. For instance, a user can invoke an automated assistant by making an invocation gesture, pushing one or more invocation buttons (physical and/or virtual), squeezing a device, performing one or more additional or alternative physical actions, and/or combinations thereof.

At block 704, the system determines whether a user invoked the automated assistant client. In some implementations, the system can determine whether a candidate invocation phrase was an invocation of the automated assistant. For example, the system can determine the phrase "OK ASSIST" is not an invocation of the automated assistant client. Similarly, the system can determine the phrase "OK ASSISTANT" is an invocation of the automated assistant client. If the system determines the user invoked the automated assistant client, the process proceeds to block 706. If the system determines the user has not invoked the automated assistant client, the system proceeds to block 712.

At block 706, the system identifies an automated assistant query in one or more of the audio data streams. For example, the system can identify the automated assistant query in the first audio data stream, the second audio data stream, and/or the merged audio data stream. In some implementations, the query can be captured in the first audio data stream and the second audio data stream. In some implementations, at least one portion of the query is not captured in both the first audio data stream and the second audio data stream. For example, the user may be walking away from the client devices while speaking the query such that a second portion of the query is only captured by the first audio data stream (or the second audio data stream). Additionally or alternatively, the audio output rendered from the second client device may interfere with at least a portion of the query being captured in the first audio data stream and/or the second audio data stream. For example, if the audio output rendered by the second client device includes a loud explosion while the user is speaking the automated assistant query, the portion(s) of the query spoken at the same time as the loud explosion may not be captured in the second audio data stream.

At block 708, the system processes the automated assistant query to generate output. In some implementations, the generated output can include one or more control commands to control media playback at the second client device. For example, the generated output can include lowering the volume of the media playback based on the automated assistant query of "lower the volume by 10".

At block 710, the system controls the media playback at the second client device based on the output (e.g., the output generated at block 708) and proceeds to block 712.

At block 712, determines whether one or more conditions to continue monitoring for an invocation are satisfied. For example, the one or more conditions can include the user to explicitly end the media playback (e.g., speaking an automated assistant query ending the media playback, for the user to select a button (physical and/or virtual) to end the media playback, for the selected media to finish playing, for a playlist including the selected media to finish playing, for a predetermined amount of time to have passed, for one or more additional or alternative conditions to be satisfied, and/or combinations thereof. If the system determines the one or more conditions are not satisfied, the system proceeds back to block 702, and continues monitoring for an invocation of the automated assistant client via the first client device and/or the second client device. If the system determines that one or more conditions are satisfied, the system proceeds to block 714.

At block 714, the system deletes the pairing between the first audio data stream of the first client device and the second audio data stream of the second client device.

Figure 8:
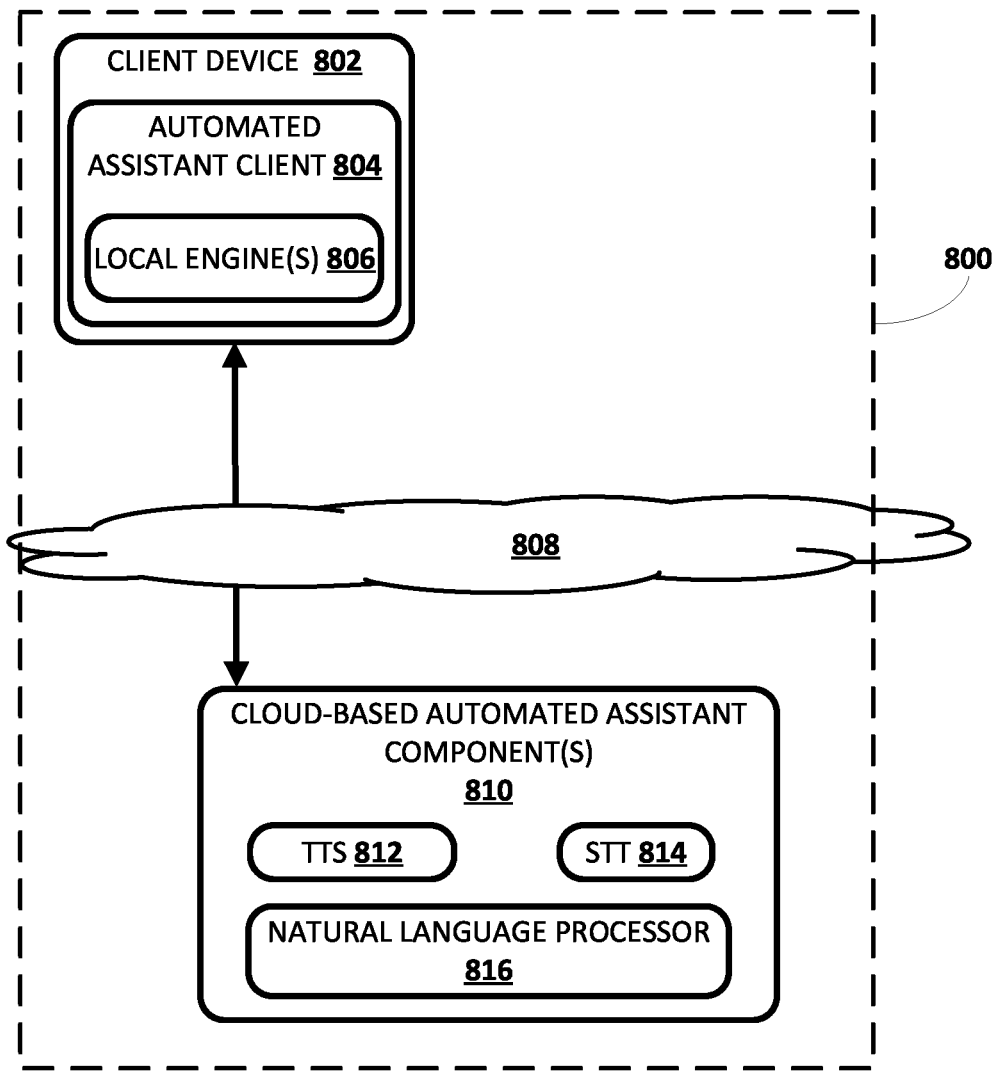
FIG. 8 illustrates a block diagram of another example environment in which implementations disclosed herein may be implemented.

Turning now to FIG. 8, an example environment is illustrated where various implementations can be performed. FIG. 8 is described initially, and includes a client computing device 802, which executes an instance of an automated assistant client 804. One or more cloud-based automated assistant components 810 can be implemented on one or more computing systems (collectively referred to as a "cloud" computing system) that are communicatively coupled to client device 802 via one or more local and/or wide area networks (e.g., the Internet) indicated generally at 808.

An instance of an automated assistant client 804, by way of its interactions with one or more cloud-based automated assistant components 810, may form what appears to be, from the user's perspective, a logical instance of an automated assistant 800 with which the user may engage in a human-to-computer dialog. An instance of such an automated assistant 800 is depicted in FIG. 8. It thus should be understood that in some implementations, a user that engages with an automated assistant client 804 executing on client device 802 may, in effect, engage with his or her own logical instance of an automated assistant 800. For the sakes of brevity and simplicity, the term "automated assistant" as used herein as "serving" a particular user will often refer to the combination of an automated assistant client 804 executing on a client device 802 operated by the user and one or more cloud-based automated assistant components 810 (which may be shared amongst multiple automated assistant clients of multiple client computing devices). It should also be understood that in some implementations, automated assistant 800 may respond to a request from any user regardless of whether the user is actually "served" by that particular instance of automated assistant 800.

The client computing device 802 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 802 may optionally operate one or more other applications that are in addition to automated assistant client 804, such as a message exchange client (e.g., SMS, MMS, online chat), a browser, and so forth. In some of those various implementations, one or more of the other applications can optionally interface (e.g., via an application programming interface) with the automated assistant 800, or include their own instance of an automated assistant application (that may also interface with the cloud-based automated assistant component(s) 810).

Automated assistant 800 engages in human-to-computer dialog sessions with a user via user interface input and output devices of the client device 802. To preserve user privacy and/or to conserve resources, in many situations a user must often explicitly invoke the automated assistant 800 before the automated assistant will fully process a spoken utterance. The explicit invocation of the automated assistant 800 can occur in response to certain user interface input received at the client device 802. For example, user interface inputs that can invoke the automated assistant 800 via the client device 802 can optionally include actuations of a hardware and/or virtual button of the client device 802. Moreover, the automated assistant client can include one or more local engines 806, such as an invocation engine that is operable to detect the presence of one or more spoken invocation phrases. The invocation engine can invoke the automated assistant 800 in response to detection of one of the spoken invocation phrases. For example, the invocation engine can invoke the automated assistant 800 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 802, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 800. As used herein, "invoking" the automated assistant 800 can include causing one or more previously inactive functions of the automated assistant 800 to be activated. For example, invoking the automated assistant 800 can include causing one or more local engines 806 and/or cloud-based automated assistant components 810 to further process audio data frames based on which the invocation phrase was detected, and/or one or more following audio data frames (whereas prior to invoking no further processing of audio data frames was occurring). For instance, local and/or cloud-based components can process captured audio data using a two-pass ASR model in response to invocation of the automated assistant 800.

The one or more local engine(s) 806 of automated assistant 800 are optional, and can include, for example, the pairing engine described above, the media playback engine described above, the query engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 802 is relatively constrained in terms of computing resources (e.g., processor cycles, memory, battery, etc.), the local engines 806 may have limited functionality relative to any counterparts that are included in cloud-based automated assistant components 810.

Cloud-based automated assistant components 810 leverage the virtually limitless resources of the cloud to perform more robust and/or more accurate processing of audio data, and/or other user interface input, relative to any counterparts of the local engine(s) 806. Again, in various implementations, the client device 802 can provide audio data and/or other data to the cloud-based automated assistant components 810 in response to the invocation engine detecting a spoken invocation phrase, or detecting some other explicit invocation of the automated assistant 800.

The illustrated cloud-based automated assistant components 810 include a cloud-based TTS module 812, a cloud-based STT module 814, a natural language processor 816, a dialog state tracker 818, and a dialog manager 820. In some implementations, one or more of the engines and/or modules of automated assistant 800 may be omitted, combined, and/or implemented in a component that is separate from automated assistant 800. Further, in some implementations automated assistant 800 can include additional and/or alternative engines and/or modules. Cloud-based STT module 814 can convert audio data into text, which may then be provided to natural language processor 816.

Cloud-based TTS module 812 can convert textual data (e.g., natural language responses formulated by automated assistant 800) into computer-generated speech output. In some implementations, TTS module 812 may provide the computer-generated speech output to client device 802 to be output directly, e.g., using one or more speakers. In other implementations, textual data (e.g., natural language responses) generated by automated assistant 800 may be provided to one of the local engine(s) 806, which may then convert the textual data into computer-generated speech that is output locally.

Natural language processor 816 of automated assistant 800 processes free form natural language input and generates, based on the natural language input, annotated output for use by one or more other components of the automated assistant 800. For example, the natural language processor 816 can process natural language free-form input that is textual input that is a conversion, by STT module 814, of audio data provided by a user via client device 802. The generated annotated output may include one or more annotations of the natural language input and optionally one or more (e.g., all) of the terms of the natural language input.

In some implementations, the natural language processor 816 is configured to identify and annotate various types of grammatical information in natural language input. In some implementations, the natural language processor 816 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 816 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 816 may rely on annotations from one or more other components of the natural language processor 816. In some implementations, in processing a particular natural language input, one or more components of the natural language processor 816 may use related prior input and/or other related data outside of the particular natural language input to determine one or more annotations.

Figure 9:
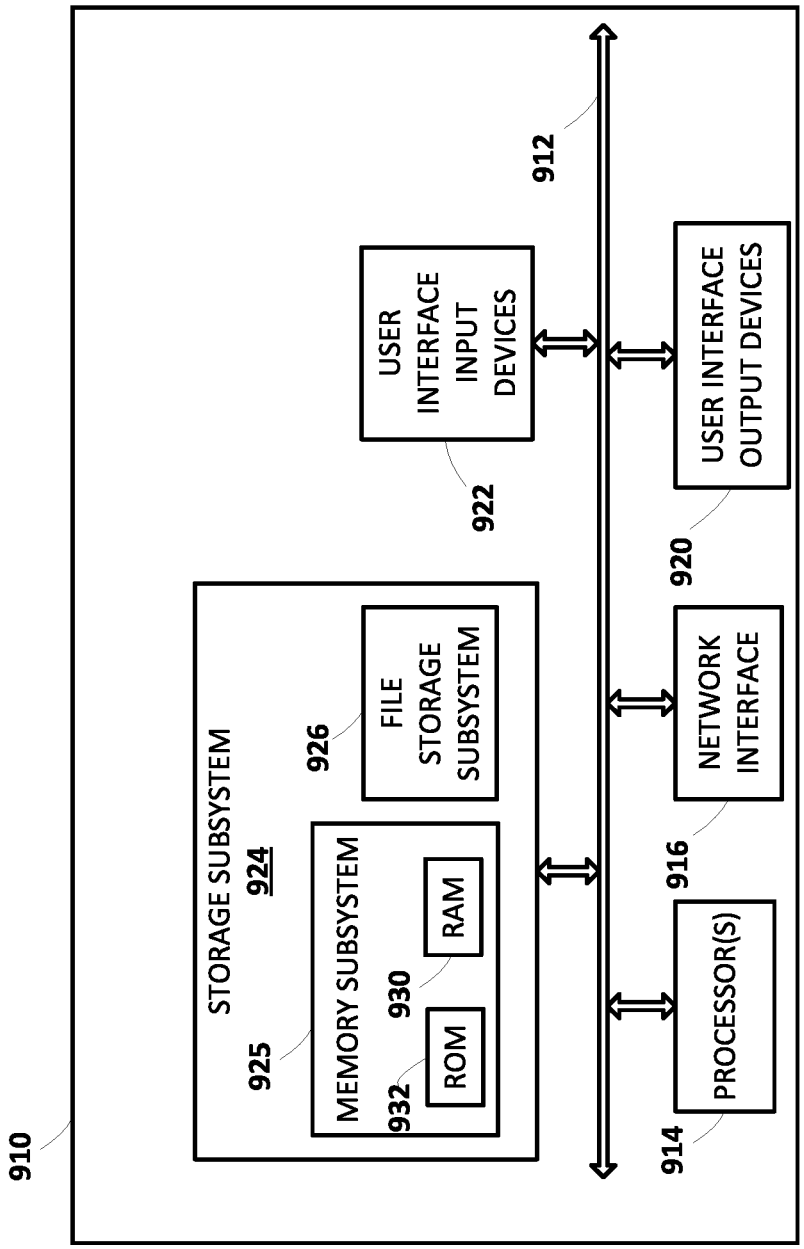
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the process of FIG. 6 and/or FIG. 7, as well as to implement various components depicted in FIG. 5 and/or FIG. 8.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes determining, based on processing input received from a user of a first client device, to initiate playback of media at a second client device. In some implementations, in response to determining to initiate the playback of the media at the second client device and in response to the input being received at the first client device, the method further includes generating, for a period of time, a pairing between a first audio data stream and a second audio data stream, the first audio data stream detected via one or more first microphones of the first client device and the second audio data stream detected via one or more second microphones of the second device. In some implementations, in response to determining the user invoked the first client device and/or the second client device, and based on the pairing, the method further includes processing an automated assistant query captured in the first audio data stream and/or the second audio data stream.

These and other implementations of the technology can include one or more of the following features.

In some implementations, the automated assistant query is captured in an utterance spoken by the user subsequent to invoking the first client device and/or the second client device. In some of those implementations, the method further includes controlling the media playback on the second client device based on the automated assistant query. In some versions of those implementations, the utterance is captured via the one or more first microphones of the first client device. In some versions of those implementations, the utterance is not captured by the one or more second microphones of the second client device.

In some implementations, the utterance is not captured by the one or more second microphones of the second client device based on a distance between the user speaking the utterance and the one or more second microphones of the second client device.

In some implementations, the utterance is not captured by the one or more second microphones based on interference between an audio portion of the media and the utterance.

In some implementations, the utterance is additionally captured via one or more second microphones of the second client device.

In some implementations, the utterance is captured via the one or more second microphones of the second client device and the utterance is not captured at the one or more first microphones of the first client device.

In some implementations, generating, for the period of time, the pairing between the first audio data stream and the second audio data stream comprises generating a merged audio data stream by merging the first audio data stream and the second audio data stream via a communications channel, and wherein processing the automated assistant query captured in the first audio data stream and/or the second audio data stream comprises processing the automated assistant query captured in the merged audio data stream.

In some implementations, for the period of time, the pairing between the first audio data stream and the second audio data stream comprises processing the first audio data stream in parallel with processing the second audio data stream, and wherein processing the automated assistant query captured in the first audio data stream and/or the second audio data stream includes processing the first audio data stream in parallel with processing the second audio data stream.

In some implementations, the method further includes determining whether the playback of the media at the second client device has ceased based on determining whether one or more conditions are satisfied. In some implementations, in response to determining the playback of the media at the second client device has ceased, the method further includes deleting the pairing between the first audio data stream and the second audio data stream.

In some implementations, determining whether the one or more conditions are satisfied includes determining whether the period of time has elapsed.

In some implementations, determining whether the one or more conditions are satisfied includes determining whether the user has ended the playback of the media.

In some implementations, determining whether the one or more conditions are satisfied includes determining whether the first client device is a threshold distance away from the second client device.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
determining, based on processing input received from a user of a first client device, to initiate playback of media at a second client device;
in response to determining to initiate the playback of the media at the second client device and in response to the input being received at the first client device,
generating, for a period of time, a pairing between a first audio data stream and a second audio data stream, the first audio data stream detected via one or more first microphones of the first client device and the second audio data stream detected via one or more second microphones of the second client device; and
in response to determining the user invoked the first client device and/or the second client device, and based on the pairing:
processing an automated assistant query captured in the first audio data stream and/or the second audio data stream.

2. The method of claim 1, wherein the automated assistant query is captured in an utterance spoken by the user subsequent to invoking the first client device and/or the second client device, and further comprising:
controlling the media playback on the second client device based on the automated assistant query.

3. The method of claim 2, wherein the utterance is captured via the one or more first microphones of the first client device.

4. The method of claim 2, wherein the utterance is not captured by the one or more second microphones of the second client device.

5. The method of claim 4, wherein the utterance is not captured by the one or more second microphones of the second client device based on a distance between the user speaking the utterance and the one or more second microphones of the second client device.

6. The method of claim 4, wherein the utterance is not captured by the one or more second microphones based on interference between an audio portion of the media and the utterance.

7. The method of claim 3, wherein the utterance is additionally captured via one or more second microphones of the second client device.

8. The method of claim 2, wherein the utterance is captured via the one or more second microphones of the second client device and the utterance is not captured at the one or more first microphones of the first client device.

9. The method of claim 1, wherein generating, for the period of time, the pairing between the first audio data stream and the second audio data stream comprises generating a merged audio data stream by merging the first audio data stream and the second audio data stream via a communications channel, and wherein processing the automated assistant query captured in the first audio data stream and/or the second audio data stream comprises processing the automated assistant query captured in the merged audio data stream.

10. The method of claim 1, wherein, for the period of time, the pairing between the first audio data stream and the second audio data stream comprises processing the first audio data stream in parallel with processing the second audio data stream, and wherein processing the automated assistant query captured in the first audio data stream and/or the second audio data stream comprises processing the first audio data stream in parallel with processing the second audio data stream.

11. The method of claim 1, further comprising:
determining whether the playback of the media at the second client device has ceased based on determining whether one or more conditions are satisfied; and in response to determining the playback of the media at the second client device has ceased, deleting the pairing between the first audio data stream and the second audio data stream.

12. The method of claim 11, wherein determining whether the one or more conditions are satisfied includes determining whether the period of time has elapsed.

13. The method of claim 11, wherein determining whether the one or more conditions are satisfied includes determining whether the user has ended the playback of the media.

14. The method of claim 11, wherein determining whether the one or more conditions are satisfied includes determining whether the first client device is a threshold distance away from the second client device.

15. A system comprising
memory storing instructions;
one or more processors operable to execute the instructions to:
determine, based on processing input received from a user of a first client device, to initiate playback of media at a second client device;
in response to determining to initiate the playback of the media at the second client device and in response to the input being received at the first client device, generate, for a period of time, a pairing between a first audio data stream and a second audio data stream, the first audio data stream detected via one or more first microphones of the first client device and the second audio data stream detected via one or more second microphones of the second client device; and
in response to determining the user invoked the first client device and/or the second client device, and based on the pairing:
process an automated assistant query captured in the first audio data stream and/or the second audio data stream.

16. The system of claim 15, wherein the automated assistant query is captured in an utterance spoken by the user subsequent to invoking the first client device and/or the second client device, and wherein one or more of the processors are further operable to execute the instructions to:
control the media playback on the second client device based on the automated assistant query.

17. The system of claim 16, wherein the utterance is captured via the one or more first microphones of the first client device.

18. The system of claim 16, wherein the utterance is not captured by the one or more second microphones of the second client device.

19. The system of claim 18, wherein the utterance is not captured by the one or more second microphones of the second client device based on a distance between the user speaking the utterance and the one or more second microphones of the second client device.

20. The system of claim 18, wherein the utterance is not captured by the one or more second microphones based on interference between an audio portion of the media and the utterance.

* * * * *